Jan. 23, 1940.　　　R. O. DIEDRICH　　　2,188,201
MEASURING INSTRUMENT
Filed Dec. 9, 1937
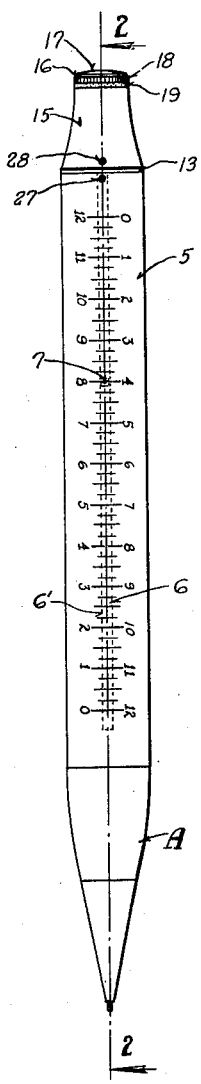
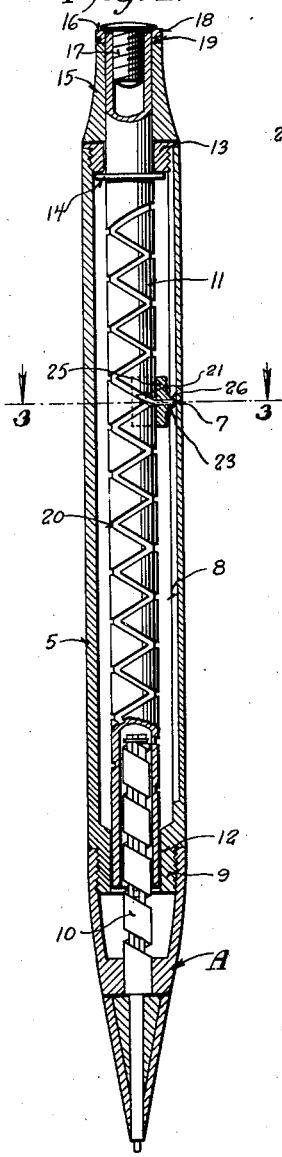
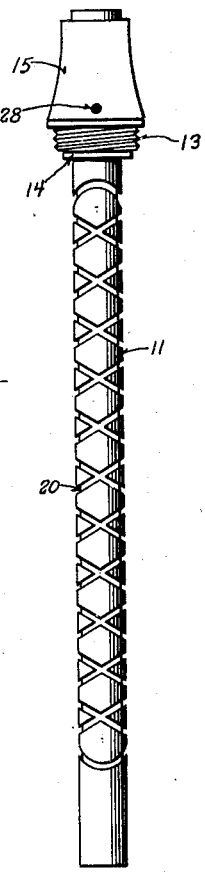
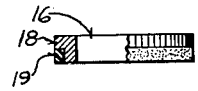
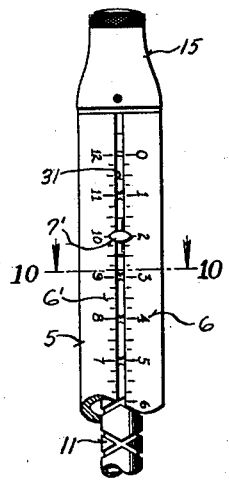
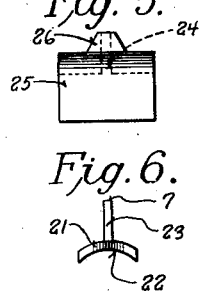
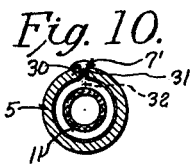
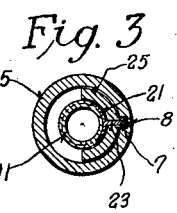
Inventor
Richard O. Diedrich
By Ira Milton Jones
Attorney Patented Jan. 23, 1940

2,188,201

UNITED STATES PATENT OFFICE 2,188,201

MEASURING INSTRUMENT

Richard O. Diedrich, Menomonie, Wis.

Application December 9, 1937, Serial No. 178,950

10 Claims. (Cl. 33—141)

This invention relates to measuring instruments and has as a general object to provide a small convenient device capable of measuring any linear or curvilinear distance in one uninterrupted operation.

Another object of this invention is to provide a device of the character described which is sufficiently compact as to permit its embodiment in a conventional mechanical pencil.

More specifically it is an object of this invention to provide a measuring instrument wherein a rotating traction member is drivingly connected with an indicator movable along a scale in such a manner that the indicator is caused to uninterruptedly move back and forth along the scale.

Another object of this invention resides in the provision of a reversible traction wheel having different types of traction surfaces to more effectively adapt the instrument to the measurement of distances over different types of surfaces.

It is also an object of this invention to so construct the measuring instrument that the lead propelling mechanism of the mechanical pencil is telescoped into the interior thereof to conserve space and insure a small compact assembly.

It is also an object of this invention to provide a measuring instrument of the character described with a hollow transparent outer casing having the scale delineated thereon and enclosing an indicator which moves longitudinally along the scale and is visible by virtue of the transparency of the casing.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates two complete examples of the physical embodiment of the invention constructed according to the best modes so far devised for the practical application of the principles thereof, and in which:

Figure 1 is a view in side elevation of a measuring device embodying this invention;

Figure 2 is an enlarged longitudinal sectional view taken through Figure 1 on the plane of the line 2—2;

Figure 3 is a cross sectional view taken substantially along the line 3—3 in Figure 2;

Figure 4 is a side view of the driving screw shown separated from the rest of the mechanism;

Figure 5 is a side view of the indicator carrier which embraces the screw and moves longitudinally therealong;

Figure 6 is an end view of the tracer which engages the threads of the screw and is mounted in the carrier with a part thereof forming the indicator;

Figure 7 is a top view of the tracer;

Figure 8 is a view partially in side elevation and partially in section of the reversible traction wheel;

Figure 9 is a side elevational view showing the outer end portion of a slightly modified embodiment of the invention; and Figure 10 is a cross sectional view taken through Figure 9 on the plane of the line 10—10.

Referring now particularly to the accompanying drawing in which like numerals indicate like parts throughout the several views, the numeral 5 designates the outer casing or barrel of the measuring instrument, which, as illustrated, is preferably cylindrical and of a size comparable to that of a conventional mechanical pencil.

This casing or barrel has a double scale 6—6' delineated thereon which may represent inches, feet, or any other suitable unit of linear measurement. As shown, the two scales are reversed with respect to each other so that an indicator 7 movable longitudinally inside of the barrel and directly under the scales may, by continuous back and forth movement along the scale, effect the measurement of any length; it being understood that the number of back and forth passes which the indicator makes during the measurement are counted.

The casing or barrel 5, or at least that portion thereof on which the scales are delineated, is transparent, to permit the indicator to show, and to properly guide the indicator for movement along the scales, the bore of the casing is provided with a longitudinal groove 8 in which part of the indicator is slidably received.

At one end, the casing has a threaded nipple 9 onto which an automatic pencil mechanism, indicated generally by the character A, is threaded. The specific construction of this mechanism forms no part of this invention and need not be described. It is desired to note, however, that its lead propelling means 10 extends into the adjacent end of a tubular screw shaft 11 rotatably mounted in the casing or barrel, and operable to effect longitudinal movement of the indicator along the scales. In this manner, a more compact construction is obtained.

At one end the hollow screw shaft 11 is journalled in a bearing 12 formed as an integral part of the end of the casing or barrel to which the mechanical pencil is attached, and at its other end it is rotatably received in a nut 13 threaded into the barrel or casing. A flange 14 on the hollow screw shaft engaging the under-surface of the nut holds the screw shaft in the barrel or casing.

That portion of the screw shaft which projects beyond the nut 13 has a sleeve or cap 15 mounted thereon. This sleeve or cap terminates short of the extreme end of the screw shaft and provides a shoulder against which a reversible traction wheel or collar 16 may be clamped, the traction wheel or collar being fitted onto the outer end of the screw shaft. A screw 17 having a head smaller than the diameter of the traction wheel and threaded into the adjacent end of the screw shaft clamps the traction wheel in place. Thus, rotation may be imparted to the screw shaft by moving the instrument over a surface with the outer peripheral edge of the traction wheel or collar engaging the surface.

As best shown in Figure 8, the traction wheel is formed partially of metal and partially of rubber. The metal portion 18 has its edge serrated to grip such surfaces as wood or paper, while the rubber portion 19, which is provided by a rubber band embracing a reduced portion of the wheel or collar, is more ideally suited for gripping a smooth surface, such as glass.

To present either of the two surfaces of the traction wheel in position for use, it is obviously only necessary to remove the screw 17 and place the bushing on the outer end of the screw shaft with the desired surface outermost.

The screw shaft has crossed threads 20 in the form of grooves joined at the opposite ends of the shaft so that rotation of the shaft effects a back and forth motion of the indicator 7 through the medium of a tracer 21 which engages the threads. The tracer 21, as best shown in Figures 6 and 7, has a curved portion 22 of a size to fit the threads and an outwardly projecting pin 23, the outer end of which constitutes the marker of the indicator.

This pin is freely rotatably received in a bore 24 formed in a substantially semicylindrical carrier or housing 25. The housing is shaped to fit the outer cylindrical surface of the screw shaft and is freely slidable thereover.

A projection 26 on the outer surface of the carrier or housing engages in the longitudinal groove 8 to hold the carrier, and consequently, the indicator, against rotation while permitting free longitudinal movement thereof.

In using the instrument, the indicator is first propelled to either end of the scales and then with the traction wheel properly engaging the surface along which the measurement is to be made, the entire instrument is moved over the surface along the line of measurement. Obviously, it is immaterial whether this line is straight or curved.

The motion of the instrument over the surface through rotation of the screw shaft 11 propels the indicator along the scale back and forth if the distance to be measured exceeds that which may be represented by the length of the scale so that the entire distance can be measured in one continuous operation, it being merely necessary to count the number of return trips which the indicator makes along the scales. As will be apparent, such motion of the indicator is caused during continual rotation of the traction wheel in either direction.

To facilitate setting the instrument at zero, the barrel or casing 5 and the sleeve on the rotating screw shaft have cooperating dots 27 and 28, respectively, which are in exact alignment when the indicator or pointer is at either end of the scales.

In the preferred embodiment of the invention as hereinbefore described, the indicator or pointer is visible through the transparent casing. This construction is preferable as it facilitates holding the instrument during the measurement and also excludes dirt and foreign matter from the interior of the mechanism. However, the broad objects of the invention can also be attained with a construction in which the indicator projects through a slot in the barrel or casing.

Such a construction is illustrated in Figures 9 and 10. The embodiment of the invention shown in these views is identical with that described with the exception that the indicator 7' has a portion 30 which passes through a longitudinal slot 31 in the barrel or casing between its two scales, the outer end thereof being formed with a double ended arrow or pointer to coact with the scales on opposite sides of the slot. In this instance, the indicator carrier completely encircles the threaded shaft, but the tracer 32, engages the grooves or threads of the screw shaft and is mounted in the indicator portion of the carrier in the same manner as in the construction hereinbefore described.

The traction wheel or collar has its entire cylindrical surface suitably roughened, or the entire collar may be formed of material capable of properly gripping any surface to be measured. The operation of this form of the invention is identical to that described.

From the foregoing description taken in connection with the accompanying drawing, it will be readily apparent to those skilled in the art that this invention provides a convenient measuring instrument for quickly and accurately determining the length of any distance, which may be measured over a surface, and that any distance either linear or curvilinear may be measured in one continuous operation.

What I claim as my invention is:

1. A measuring instrument of the character described comprising: a hollow barrel; a longitudinal scale carried by the barrel; an indicator movable along the scale; a traction wheel adapted to be rotated by engagement of the periphery of the wheel with a surface and movement of the instrument bodily over the surface; and a shaft having crossed right and left threads connected at their ends and engageable by a part on the indicator and connected with said traction wheel for translating continuous rotation of the traction wheel into an uninterrupted motion of the indicator back and forth along the scale.

2. In a measuring instrument of the character described: a tubular casing; a scale carried thereby and extending longitudinally along the length thereof; a screw shaft rotatable within the casing and having crossed right and left threads joined at their ends; an indicator movable along the scale; means connected with the indicator engaging said crossed threads for driving the indicator uninterruptedly and successively back and forth along the scale upon continuous rotation of the screw shaft in either direction; and a traction wheel for imparting rotation to the screw shaft.

3. In a measuring instrument of the character described: a tubular casing; a scale carried thereby and extending longitudinally along the length thereof; a screw shaft rotatable within the casing and having crossed right and left threads joined at their ends; an indicator movable along the scale; means connected with the indicator engaging said crossed threads for driving the indicator uninterruptedly and successively back and forth along the scale upon continuous rotation of the screw shaft in either direction; and a traction member fixed to the screw shaft and engageable with a surface so as to impart rotation to the screw shaft upon bodily movement of the instrument over the surface with the traction member in engagement therewith.

4. In a measuring instrument of the character described: a tubular casing; a longitudinal scale carried by the casing, the casing being transparent at least at that portion thereof carrying the scale; an indicator within the casing and movable along the scale, said indicator being visible through the transparent wall of the casing; a traction wheel; and means for translating rotation of the traction wheel into uninterrupted back and forth longitudinal motion of the indicator.

5. In a measuring instrument of the character described: a tubular casing; a longitudinal scale carried by the casing; the casing being transparent at least at its portion which carries the scale and having a longitudinal groove opening to its bore along the length of the scale; an indicator having a part slidably received in said groove and movable longitudinally along the length of the scale, said indicator being visible through the transparent wall of the casing; a traction member; and means driven by the traction member for uninterruptedly propelling the indicator back and forth along the scale.

6. In a measuring device of the character described: a tubular casing; a longitudinal scale on the casing; a rotatable screw shaft within the casing having crossed right and left threads joined at their ends; an indicator having a portion engaging said screw threads; the inner wall of the casing having a longitudinal groove extending along the length of the scale; a part on the indicator slidably engaging in said groove so that the indicator is held against rotation with respect to the screw shaft and is caused to successively traverse the scale by continuous rotation of the shaft in either direction; and a traction member drivingly connected with the screw shaft and engageable with a surface to revolve and impart rotation to the shaft upon bodily movement of the instrument over the surface with the traction member in engagement therewith.

7. In a measuring instrument of the character described: a scale; an indicator movable along the scale; a screw shaft connected with the indicator and operable to move the indicator along the scale upon rotation of the shaft; and a traction member for driving the screw shaft, said traction member having its cylindrical surface formed jointly of two different materials; and means for reversibly holding the traction member in position so that either of its traction surfaces may be in position for use.

8. In a measuring instrument of the character described: a rotatable member adapted to be driven by moving the instrument over a surface; and means for driving said member upon such motion of the instrument over the surface comprising a traction collar having part of its outer periphery formed of metal and another part thereof formed of material having a high coefficient of friction; and means for reversibly mounting said collar on the rotatable member with either of its peripheral surfaces in position for engagement with the surface over which the instrument is to be moved.

9. In a measuring instrument of the character described: a tubular casing having a longitudinal slot through its wall; a scale delineated on the casing along the slot; a screw shaft within the casing, said screw shaft having crossed right and left threads joined at their ends; an indicator having a portion slidable in the slot to cooperate with the scale and having another portion engaging the threads of the screw shaft so that continuous rotation of the screw shaft in either direction causes the indicator to successively traverse the scale; and a traction member drivingly connected with the screw shaft to impart rotation thereto by bodily movement of the instrument over a surface while the traction member is engaged therewith.

10. In a measuring instrument of the character described: a tubular casing; a longitudinal scale carried by the casing, the casing being transparent at least at that portion thereof carrying the scale; an indicator within the casing and movable along the scale, said indicator being visible through the transparent wall of the casing; a traction wheel; and means for translating rotation of the traction wheel into longitudinal motion of the indicator.

RICHARD O. DIEDRICH.